(12) United States Patent
Huang

(10) Patent No.: US 8,701,701 B2
(45) Date of Patent: Apr. 22, 2014

(54) FLOAT SWITCH OF A HUMIDIFIER

(71) Applicant: Chin-Cheng Huang, Tainan (TW)

(72) Inventor: Chin-Cheng Huang, Tainan (TW)

( * ) Notice: Subject to any disclaimer, the term of this patent is extended or adjusted under 35 U.S.C. 154(b) by 52 days.

(21) Appl. No.: 13/626,865

(22) Filed: Sep. 25, 2012

(65) Prior Publication Data

US 2014/0083524 A1    Mar. 27, 2014

(51) Int. Cl.
*F24F 6/00*    (2006.01)
*F16K 31/20*    (2006.01)

(52) U.S. Cl.
CPC .. *F24F 6/00* (2013.01); *F16K 31/20* (2013.01)
USPC .............................. 137/398; 137/572; 222/67

(58) Field of Classification Search
CPC .......................... F24F 6/00–6/18; F16K 31/20
USPC .................... 137/395–398, 572, 391; 222/67; 141/198
See application file for complete search history.

(56) References Cited

U.S. PATENT DOCUMENTS

| | | | | |
|---|---|---|---|---|
| 1,591,799 A * | 7/1926 | Tinapp | .......................... | 137/433 |
| 4,051,205 A * | 9/1977 | Grant | .............................. | 261/70 |
| 4,060,576 A * | 11/1977 | Grant | ............................. | 261/130 |
| 5,034,162 A * | 7/1991 | Chiu | ................................ | 261/24 |
| 5,133,044 A * | 7/1992 | Chiu | ............................ | 392/405 |
| 5,636,319 A * | 6/1997 | Glucksman et al. | .......... | 392/406 |
| 5,783,117 A * | 7/1998 | Byassee et al. | .................. | 261/29 |
| 6,259,860 B1 | 7/2001 | Chen-Lung et al. | | |
| 6,275,652 B1 * | 8/2001 | Chauviaux | .................... | 392/405 |
| 6,604,733 B2 * | 8/2003 | Mulvaney et al. | ........... | 261/72.1 |
| 7,182,321 B2 * | 2/2007 | Huang et al. | .................... | 261/66 |

* cited by examiner

*Primary Examiner* — Craig Schneider
(74) *Attorney, Agent, or Firm* — J.C. Patents

(57) ABSTRACT

A float switch of a humidifier at least includes a main body, a water tank and a float switch. The main body has a base located at a bottom and provided with a water tank groove and a water basin having a projected portion formed at a bottom. The water tank possesses a water outlet with plural ribs to engage with a float, a circumferential wall used to combine with a protective hood of the float switch, and a space formed between the water outlet and the circumferential wall for containing the float. The float switch is set between the water tank and the water basin, used to automatically fill water in the water basin by means of the float. When the water tank is separated from the main body, a compressing end of a pressing plate is to push up the float enabling a water stopper to seal the water outlet to prevent water from leaking outside.

10 Claims, 8 Drawing Sheets

FLOAT SWITCH OF A HUMIDIFIER

BACKGROUND OF THE INVENTION

1. Field of the Invention

This invention relates to a float switch of a humidifier, particular to one used in a drier land or season to increase indoor humidity to make a person's skin feel comfortable, provided with a float switch able to continuously fill water in a water basin to make the humidifier smoothly working and to seal a water outlet to keep water from leaking out in case of separating a water tank from a main body.

2. Description of the Prior Art

As disclosed in U.S. Pat. No. 6,259,860, a conventional float of a humidifier is mainly provided with a connect rod 25 fitting around with a coil spring 26 and having the top installed with a stopper 24. When a water tank 2 is assembled together with a body 1, as shown in FIG. 6 of the patent, the connect rod 25 is pushed up by a bottom base 120 of the body 1, forcing the stopper 24 to move upward and leave away from a water hole so as to let water in the water tank 2 flow down into a humidifying chamber. And as the water tank 2 is separated from the body 1, the coil spring is to elastically seal the water hole to prevent water in the water tank 2 from continuously flowing out, assuring a safe use.

However, as some water may still remain in the chamber of the float, and splash out to wet the body of a user if the water tank is not carefully separated from the body 1, somewhat annoying the user.

SUMMARY OF THE INVENTION

The object of this invention is to offer a humidifier directly filled with water from the top of water tank without separating the water tank from the main body, assuring safe usage.

Another object of this invention is to make the water tank apt to be separated from the main body if necessary, with water left in the water tank and its float switch kept from flowing outside.

The main characteristics of the invention are a main body, a water tank and a float switch.

The water tank is installed at one side of the main body, provided with a cap located at the top for a user to conveniently fill water therein.

The water tank can be easily separated from the main body without risk of water leaking out, advancing usage safety.

The float switch is installed in the bottom of the water tank, able to detect water amount in the water tank so as to shut down the humidifier in case of less than safety amount, more assuring usage safety.

The float switch is provided with a pressing plate able to seal a water outlet of the water tank to prevent water from flowing out while the water tank is separated from the main body.

BRIEF DESCRIPTION OF DRAWINGS

This invention is better understood by referring to the accompanying drawings, wherein.

DETAILED DESCRIPTION OF THE PREFERRED EMBODIMENT

Figure 1:
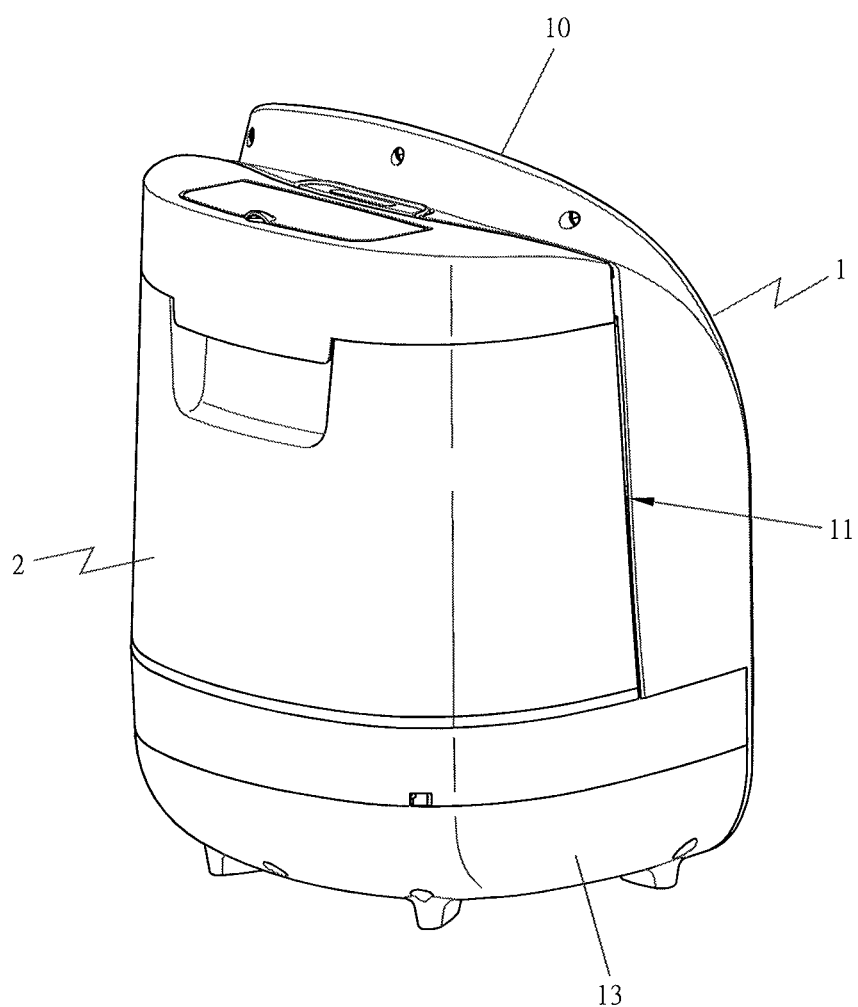
FIG. 1 is a perspective view of a preferred embodiment of a float switch of a humidifier in the present invention.
Figure 2:
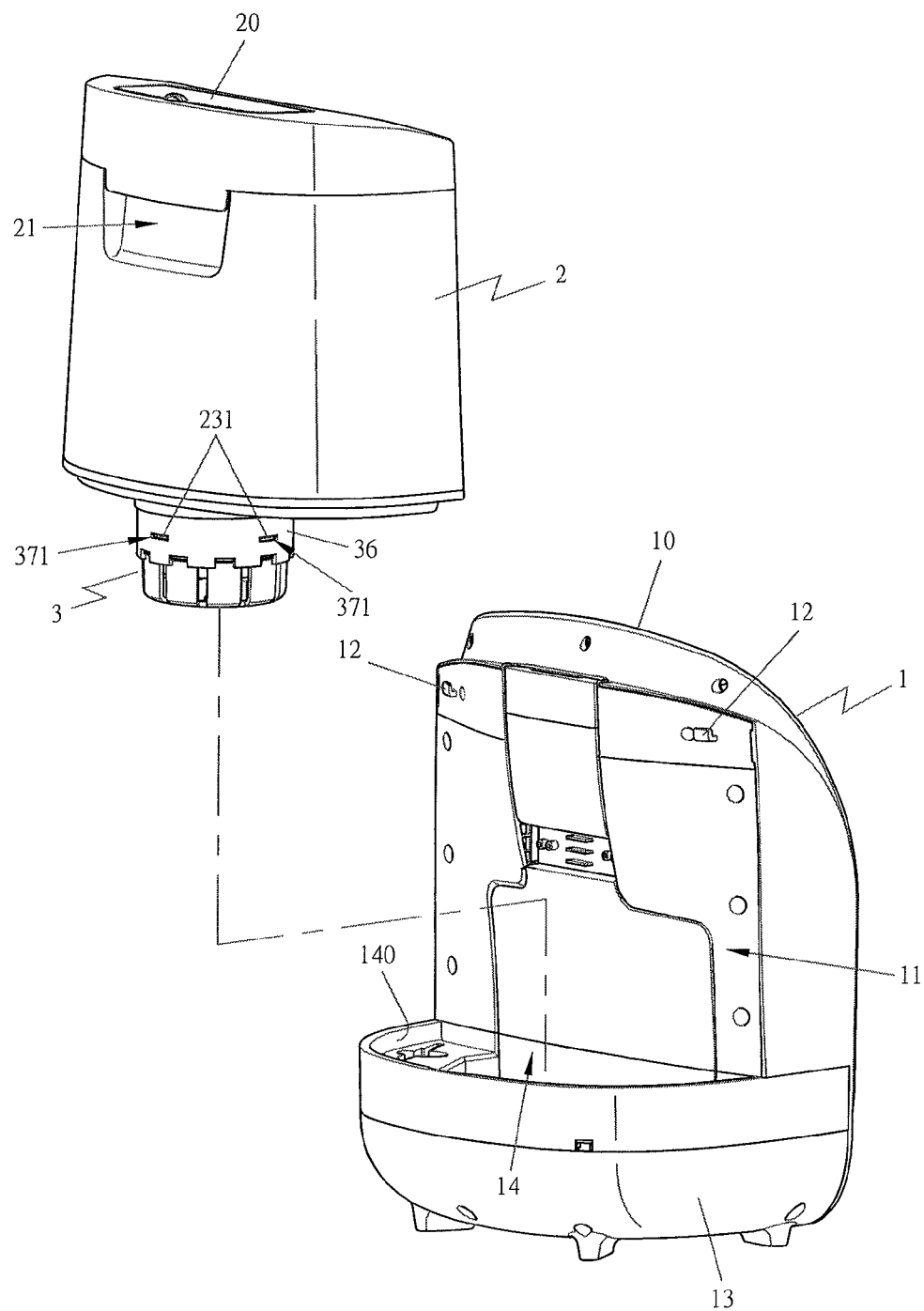
FIG. 2 is a partial exploded perspective view of the preferred embodiment of a float switch of a humidifier in the present invention.

As shown in FIGS. 1 and 2, a preferred embodiment of a float of a humidifier in the present invention includes at least a main body 1, a water tank 2, and a float switch 3.

Figure 3:
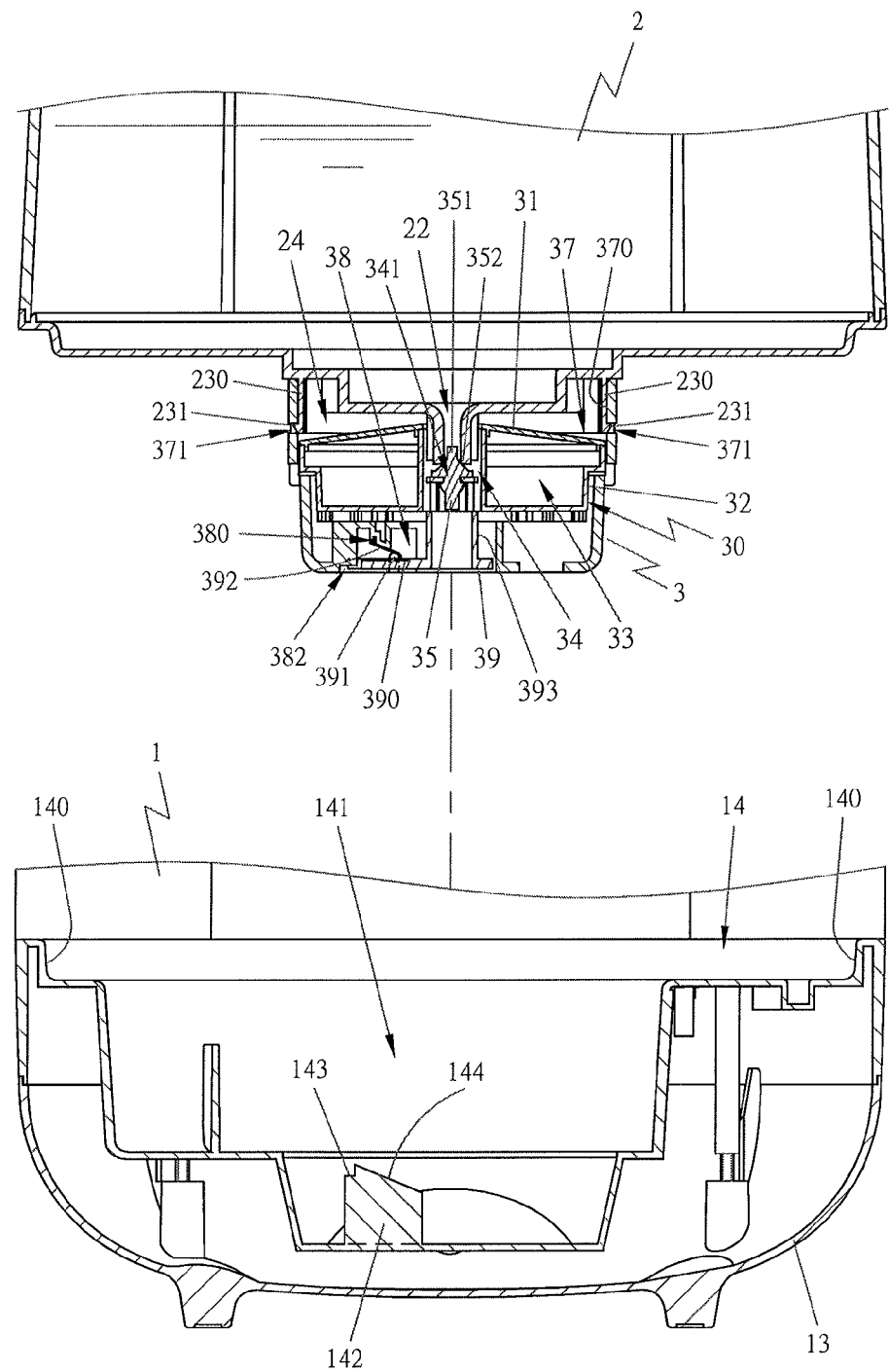
FIG. 3 is a partial cross-sectional view of the preferred embodiment of a float switch of a humidifier in the present invention.

The main body 1 is provided with an operation panel 10 known as a conventional one, a water tank space 11 reserved at one side or a rear side for accommodating the water tank 2, and plural hooks 12 for fastening the water tank 2 to make it positioned stably. Further, formed at the bottom of the main body 1 is a base 13 provided with a water tank groove 14, which has a combining circumference 140 shaped the same as a bottom circumference of the water tank 2 and a water basin 141 employed to store water needed by a heater or a supersonic device (not shown in Figs. and described herein for being a conventional one), as shown in FIG. 3. And the water basin 141 is further provided with a projected portion 142 located at the bottom, with an angled notch 143 and a sloped surface 144 formed in the top of the projected portion 142.

As shown in FIGS. 2 and 3, the water tank 2 is installed at one side of the main body 1, provided with a cap 20, from which water can be filled in the water tank 2, and a grab groove 21 formed in the rear side for being held by a hand to easily enable the water tank 2 assembled together with or separated from the main body 1. The water tank 2 is further provided with a tubular water outlet 22 located at the bottom and having plural ribs 220 (shown in FIGS. 4 and 5) set around for engaging with a float 30 of the float switch 3, and a circumferential wall 23 surrounding the water outlet 22 and having plural elastic tenons 230 respectively provided with a locking end 231 at the bottom. And a gap 24 is formed between the water outlet 22 and the circumferential wall 23.

Figure 4:
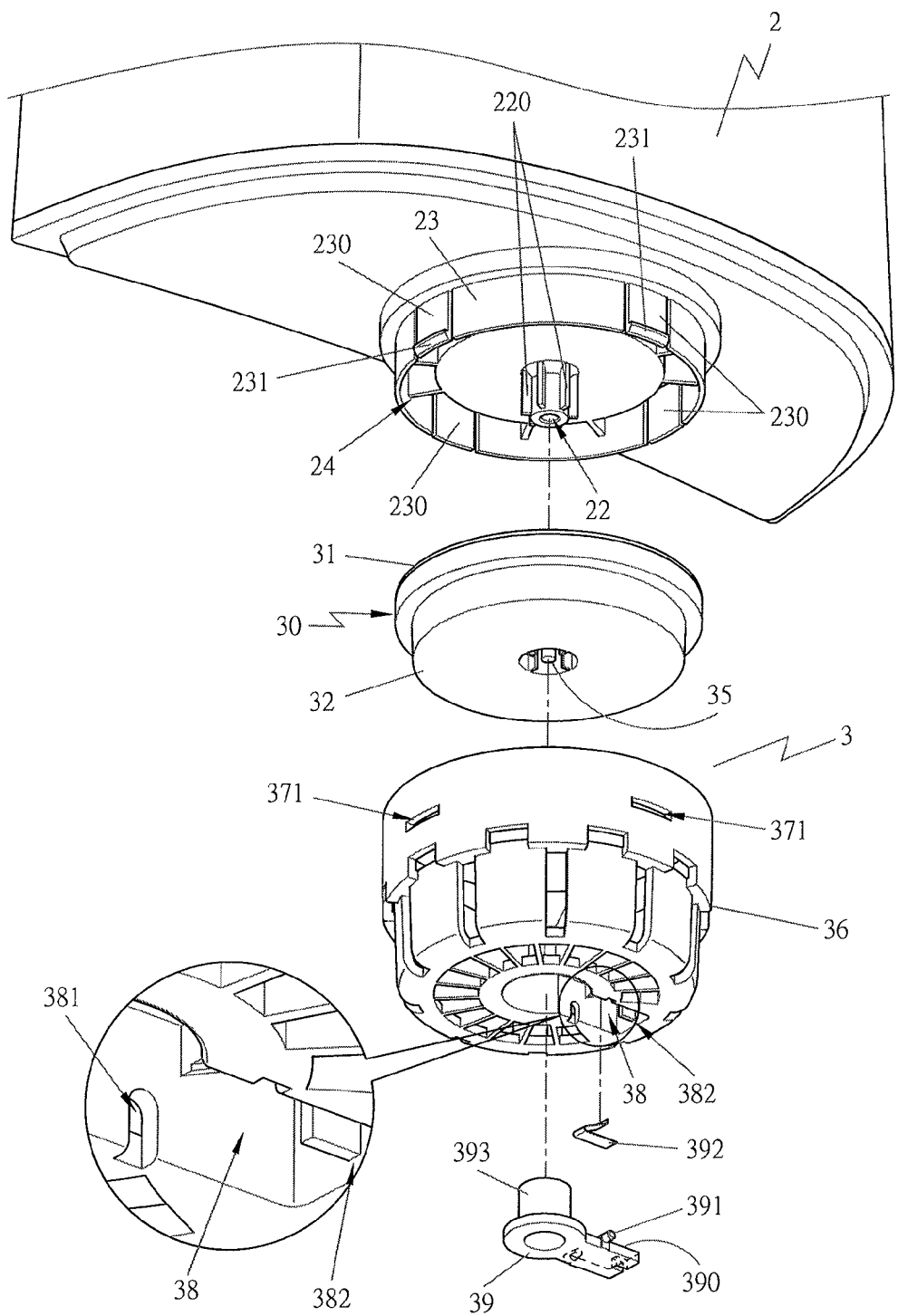
FIG. 4 is also a partial exploded perspective view of the preferred embodiment of a float switch of a humidifier in the present invention.
Figure 5:
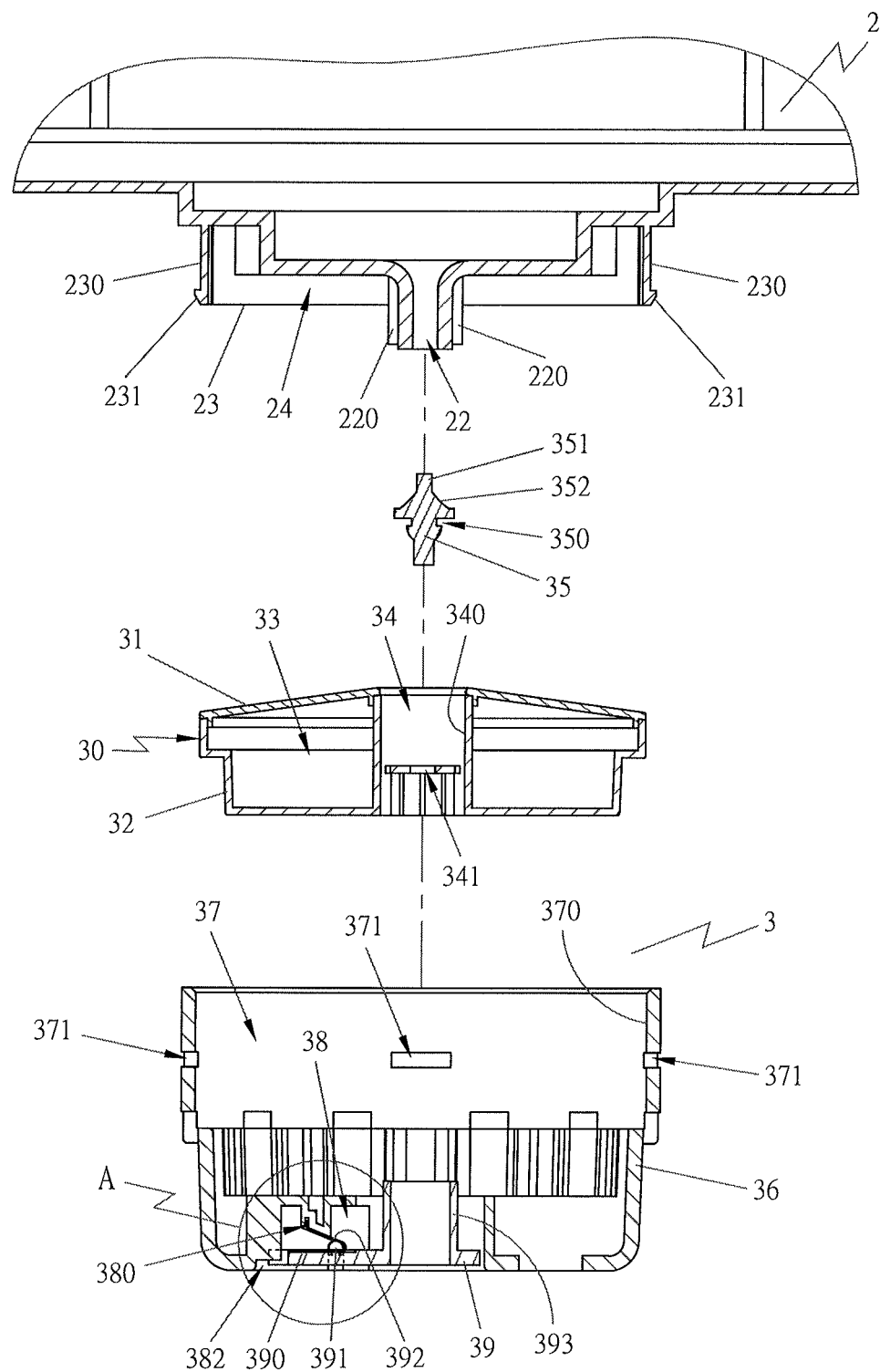
FIG. 5 is also a partial cross-sectional view of the preferred embodiment of a float switch of a humidifier in the present invention.

As shown in FIGS. 3~5, the float switch 3 is deposited below the water tank 2, provided with a float 30, a protective hood 36, a pressing plate groove 38 and a pressing plate 39.

Figure 8:
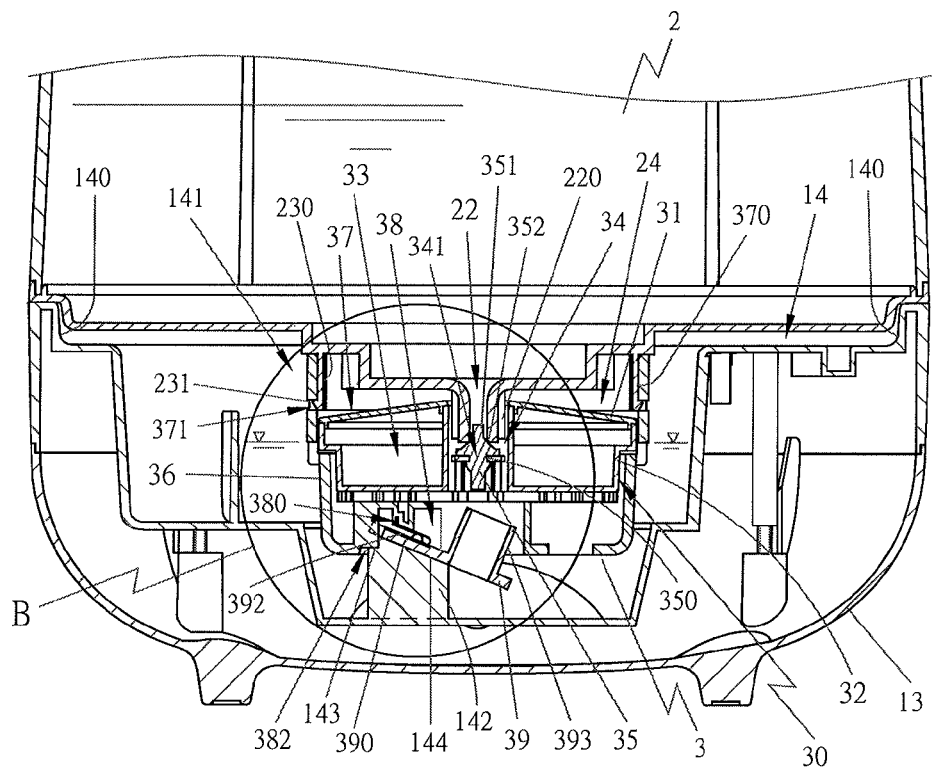
FIG. 8 is a partial cross-sectional view of the preferred embodiment of a float switch of a humidifier in the present invention, showing a float descending down from a water outlet to let water flow into a water basin.

The float 30 is provided with a first element 31. a second element 32, an air chamber 33, a combining groove 34, and a water stopper 35. The air chamber 33 is to be properly filled with air to enable the float 30 to freely move up and down together with the water level, as shown in FIGS. 8 and 10. The combining groove 34 is utilized to engage with the ribs 220 of the water outlet 22 (as shown in FIGS. 8~11), with an interval properly existing between a groove wall 340 of the combining groove 34 and the water outlet 22 to enable the float 30 to move freely together with the water level. The combining groove 34 is provided with an engaging hole 341 to fit the water stopper 35.

The water stopper 35 of the float 30 is made of a flexible material, like rubber, silicon rubber or plastics. As shown in FIGS. 8~11, the water stopper 35 is provided with an engaging circumference 350 employed to fit in the engaging hole 341 of the combining groove 34, a central bar 351 extended upward to insert in the water outlet 22, and a water stopping slope 352 able to seal or unseal the water outlet 22 of the water tank 2 depending on the water level of the water basin 141.

Figure 9:
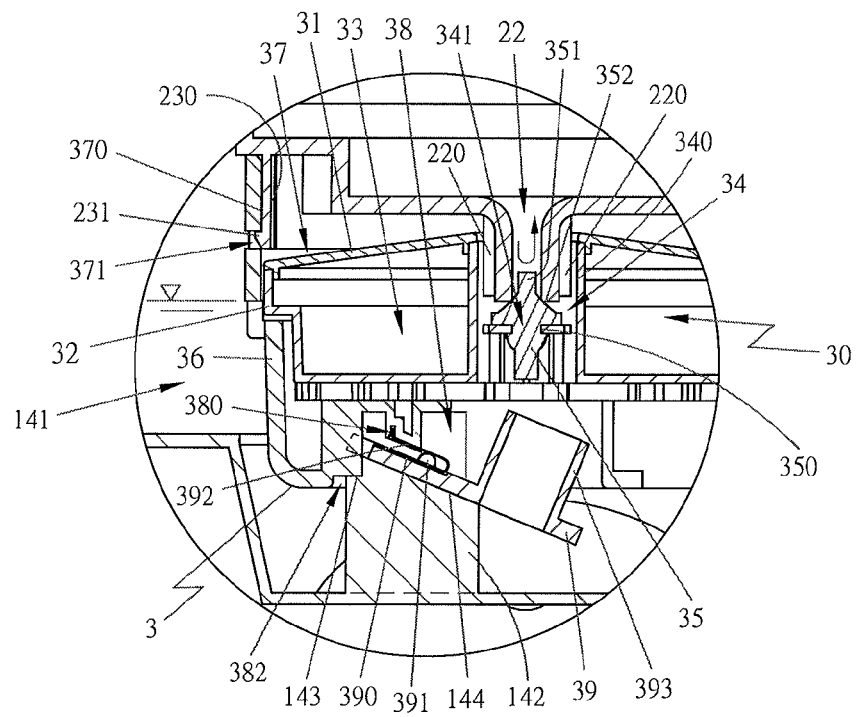
FIG. 9 is a magnified view of "B" marked in FIG. 8.
Figure 10:
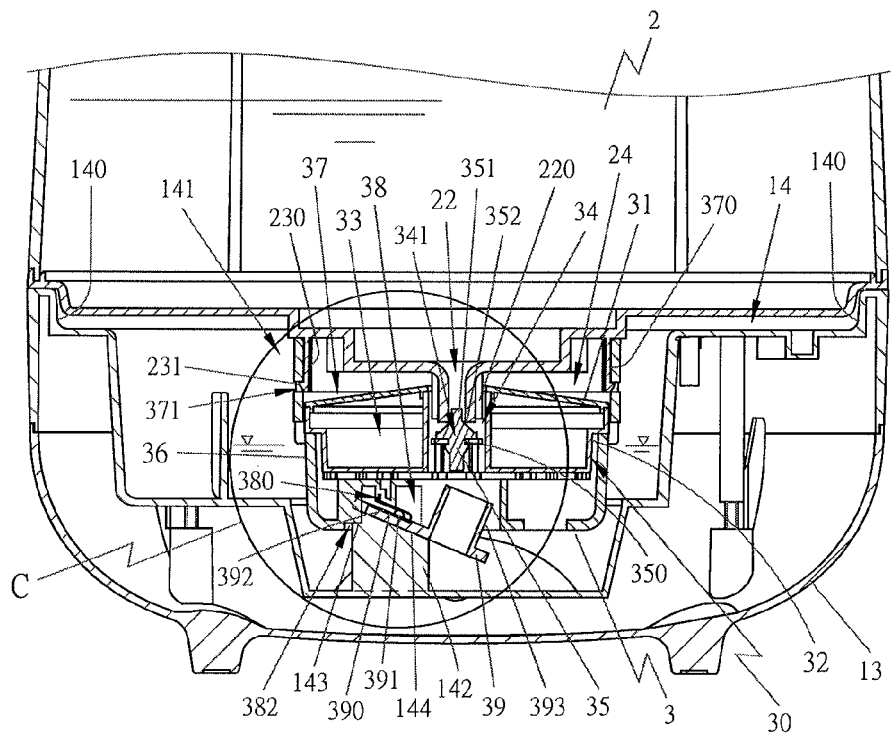
FIG. 10 is a partial cross-sectional view of the preferred embodiment of a float switch of a humidifier in the present invention, showing the water outlet sealed by the float to stop water from flowing out of the water tank.
Figure 11:
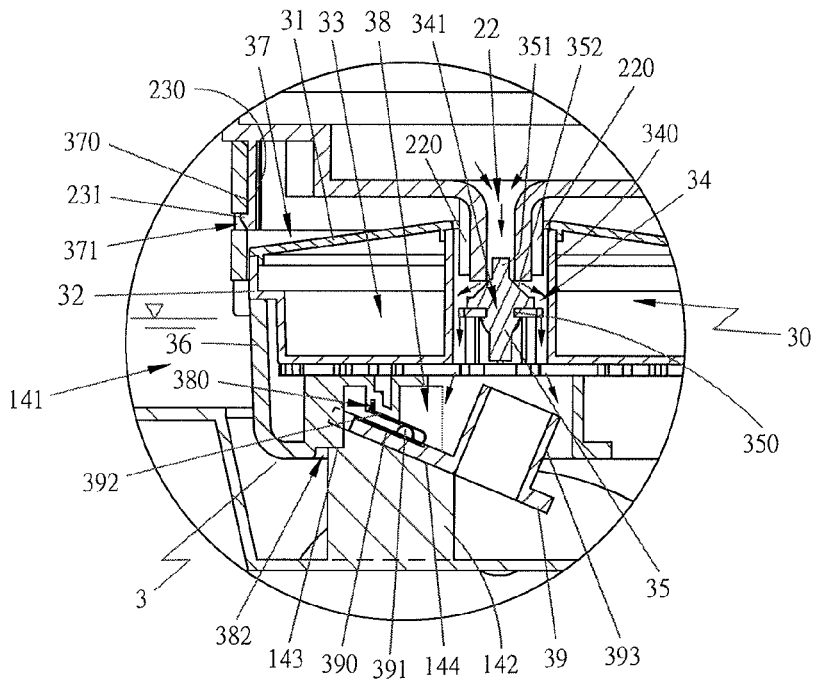
FIG. 11 is a magnified view of "C" marked in FIG. 10.

When the water basin 141 has sufficient water for the heater or the supersonic device to work with, the water stopper 35 of the float 30 is to completely seal the water outlet 22, keeping water in the water tank 22 from running into the water basin 141, as shown in FIGS. 8 and 9. On the contrary, as the water level of the water basin 141 drops down, the float 30 is to simultaneously descend accordingly to make the water stopper 35 unsealing from the water outlet 22, enabling water in the water tank 2 to automatically flow into the water basin 141. It is to be noted that as long as the water level of the water basin 141 begins lowering slightly, the float 30 can sensitively descend as well, forming a slight gap between the water stopper 35 and the water outlet 22. Thus water is able to continuously flow into the water basin 141 slightly, instead of being discretely refilled, to ensure the humidifier working smoothly, as shown in FIGS. 10 and 11.

The protective hood 36, as shown in FIGS. 4 and 5, is provided with a chamber 37 for accommodating the float 30. The chamber 37 has a chamber wall 370 cut with plural mortises 371 to engage with the locking ends 231 of the tenons 230, so as to firmly install the float switch 3 under the water outlet 22 of the water tank 2.

The pressing plate groove 38 is located in the bottom of the protective hood 36, provided with a locking slot 380 bored in the top wall for interlocking with one end of the pressing plate 39, an axial groove 381 formed at two sidewalls respectively (as shown in FIGS. 4~7) for an axle 391 of the pressing plate 39 to fit in, and a recess 382 located in one sidewall to coordinately work with the pressing plate 39.

Figure 6:
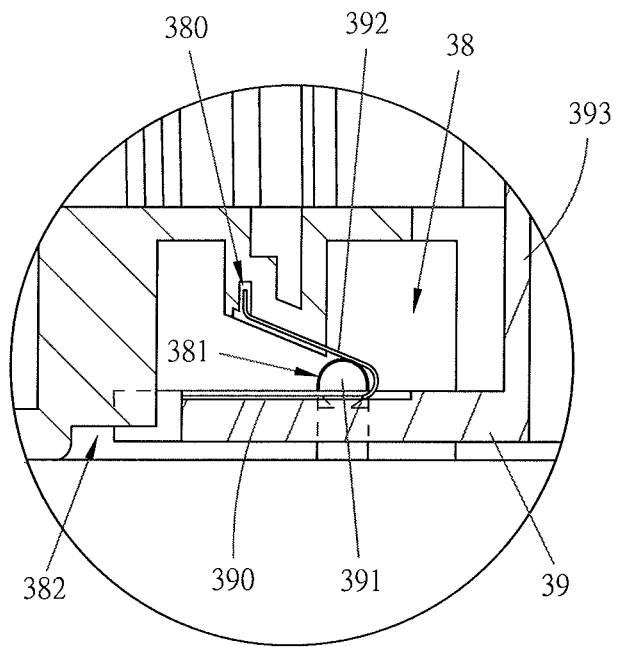
FIG. 6 is a magnified view of "A" marked in FIG. 5.
Figure 7:
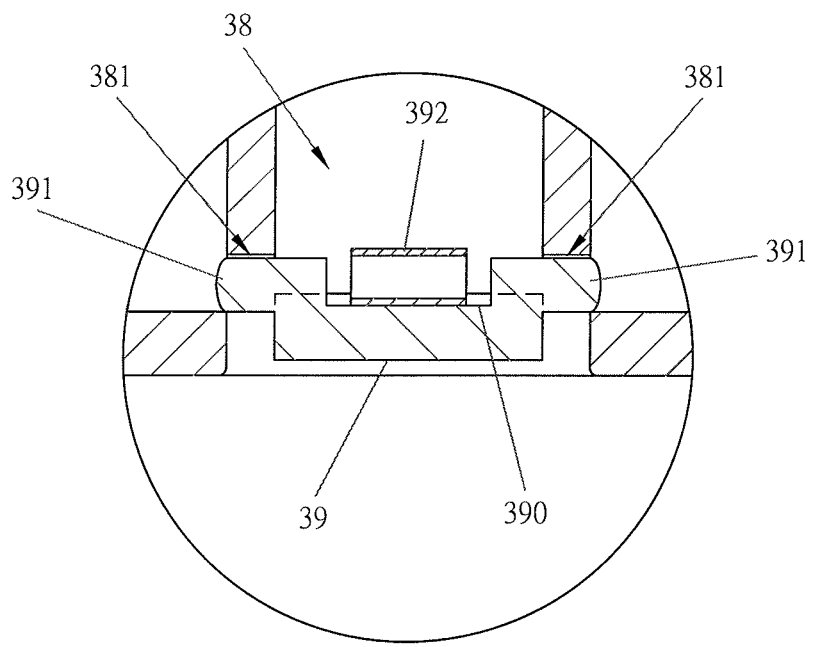
FIG. 7 is a partial magnified cross-sectional view of the preferred embodiment of a float switch of a humidifier in the present invention.

The pressing plate 39 is also located in the bottom of the protective hood 36, provided with a flat plate 390, an elastic piece 392 and a compressing end 393. As shown in FIGS. 5~7, the plate 390 has the axle 391 formed at two sides respectively to engage with the axial groove 381 of the pressing plate groove 38 to support the pressing plate 39, enabling the pressing plate 39 to turn in a certain angle and to be elastically restored to the original figure. The elastic piece 392 is bent with a certain angle, with one end of a top portion fit in the locking slot 380 of the pressing plate groove 38, and with a lower flat portion positioned on the flat plate 390, so that the pressing plate 39 can be resiliently restored to the original figure by means of the elastic piece 392.

As shown in FIGS. 3~5, if the water tank 2 is separated from the main body 1, a compressing end 393 formed at one side of the pressing plate 39 is to push up the float 30 owing to the elastic piece 392 elastically restored to the original figure, enabling the water stopping slope 352 of the water stopper 35 to seal the water outlet 22 of the water tank 2 to prevent water in the water tank 2 from flowing outside.

And, as shown in FIGS. 8~11, when the water tank 2 is combined together with the main body 1, the flat plate 390 of the pressing plate 39 is to attach with the sloped surface 144 of the water basin 141, with the angled notch 143 of the water basin 141 coordinating with the recess 382 of the pressing plate groove 38, making the float switch 3 restrictively combined with main body 1 and the water tank 2 positioned stably.

By the time, the elastic piece 392 of the pressing plate 39 is compressed by the projected portion 142 of the water basin 141 to make the compressing end 393 of the pressing plate 39 swing down with a certain angle, enabling the compressing end 393 to move away from the float 30. So can the float 30 move up and down freely in together with the water level of the water basin 141, achieving a smooth water adjustment between the water tank 2 and the water basin 141.

While the preferred embodiment of the invention has been described above, it will be recognized and understood that various modifications may be made therein and the appended claims are intended to cover all such modifications that may fall within the spirit and scope of the invention.

What is claimed is:

1. A float switch of a humidifier at least comprising:
a main body provided with a water tank space reserved for accommodating said water tank, a base located at a bottom of said main body and provided with a water tank groove and a water basin, said water basin having a projected portion formed at a bottom;
said water tank provided with a water outlet surrounded by plural ribs to engage with a float, a circumferential wall surrounding said water outlet and employed to combine with a protective hood of a float switch, a gap formed between said water outlet and said circumferential wall for containing said float of said float switch; and
said float switch provided with a float possessing a combining groove for installing said water outlet of said water tank therein, a proper interval formed between a groove wall of said combining groove and an outer wall of said water outlet, said combining groove provided with an engaging hole to engage with an engaging circumference of a water stopper, said protective hood provided with a chamber for accommodating said float and combined with said circumferential wall surrounding said water outlet of said water tank, a pressing plate groove located in a bottom of said protective hood for installing a pressing plate, said pressing plate provided with a flat plate having two support axles combined with said pressing plate groove to support said pressing plate, said pressing plate further provided with an elastic piece having one end engaged with said pressing plate groove and another end attached with said flat plate of said pressing plate, said pressing plate further provided with a compressing end able to push up said float when said water tank is separated from said main body so that said water stopper of said float can seal said water outlet to prevent water from flowing outside.

2. The float switch of a humidifier as claimed in claim 1, wherein said water tank groove of said main body is provided with a combining circumference shaped the same as a bottom circumference of said water tank.

3. The float switch of a humidifier as claimed in claim 1, wherein said projected portion of said water basin of said main body is provided with an angled notch and a sloped surface, with said sloped surface bolstering said flat plate of said pressing plate to enable said elastic piece compressed so that said compressing end of said pressing plate is to swing down with a certain angle moving away from said float to allow said float moving up and down freely together with water level in said water basin.

4. The float switch of a humidifier as claimed in claim 1, wherein said water tank is provided with a cap, from which water is directly filled in said water tank.

5. The float switch of a humidifier as claimed in claim 1, wherein said water tank is further provided with a grab groove for being held by a hand to easily make said water tank assembled together with or separated from said main body.

6. The float switch of a humidifier as claimed in claim 1, wherein said circumferential wall of said water tank is provided with plural elastic tenons respectively formed with a locking end at a bottom, said chamber of said protective hood of said float switch provided with a chamber wall cut with plural mortises to engage with said locking ends of said tenons of said water outlet so as to firmly install said float switch with said water tank.

7. The float switch of a humidifier as claimed in claim 1, wherein said float is provided with a first element and a second element, with an air chamber formed between said first element and said second element to be properly filled with air so as to enable said float to move up and down freely together with the water level of said water basin.

8. The float switch of a humidifier as claimed in claim 1, wherein said water stopper of said float is provided with a central bar to extend into said water outlet and a water stopping slope located beneath said central bar to seal said water outlet while said float is ultimately moved up or to unseal said water outlet letting water flow out while said float moves down.

9. The float switch of a humidifier as claimed in claim 1, wherein said pressing plate groove is provided with an axial groove formed at two sidewalls respectively for fitting said axle of said pressing plate so as to enable said pressing plate to swing with a certain angle.

10. The float switch of a humidifier as claimed in claim 1, wherein said pressing plate groove is further provided with a locking slot bored in a top wall for interlocking with one end of said elastic member of said pressing plate.

* * * * *